US006917279B1

(12) United States Patent
Thomas et al.

(10) Patent No.: US 6,917,279 B1
(45) Date of Patent: Jul. 12, 2005

(54) REMOTE ACCESS AND SECURITY SYSTEM

(75) Inventors: Kenneth Edwin Thomas, Auckland (NZ); John William Nelson Hodgson, Auckland (NZ)

(73) Assignee: Remote Mobile Security Access Limited, Aukland (NZ)

(*) Notice: Subject to any disclaimer, the term of this patent is extended or adjusted under 35 U.S.C. 154(b) by 0 days.

(21) Appl. No.: 09/807,482

(22) PCT Filed: Oct. 15, 1999

(86) PCT No.: PCT/NZ99/00176

§ 371 (c)(1),
(2), (4) Date: Jun. 11, 2001

(87) PCT Pub. No.: WO00/23960

PCT Pub. Date: Apr. 27, 2000

(30) Foreign Application Priority Data

Oct. 16, 1998 (NZ) .............................................. 332374

(51) Int. Cl.[7] .................................................. H04Q 1/00
(52) U.S. Cl. ..................... 340/5.23; 340/5.73; 340/5.64
(58) Field of Search ............................... 340/5.73, 5.23, 340/5.64, 5.21

(56) References Cited

U.S. PATENT DOCUMENTS 4,766,746 A * 8/1988 Henderson et al. ........ 340/5.73
5,602,536 A * 2/1997 Henderson et al. ........ 340/5.23
5,705,991 A 1/1998 Kniffin et al.
5,815,557 A * 9/1998 Larson ...................... 340/5.64

* cited by examiner

*Primary Examiner*—Brian Zimmerman
(74) *Attorney, Agent, or Firm*—Wolf, Greenfield & Sacks, P.C.

(57) ABSTRACT

A method and system for remotely controlling access to a value unit. The system includes a central control means which includes control data relating to the control of access to one or more value units by associated access controllers. The system includes remote communication means between the central control means and operator control units, and between those units and access controllers. The control data includes an identity structure for the access controller that defines its permissible behaviour, and access control data defining operator control over the access controller. The access controller remains inaccessible until its identity structure is loaded and implemented. The identity structure may be encrypted so that only the central control means and the access controller can decipher it, thus creating a virtual configuration link between the central control means and the access controller via the operator control unit. The operator control unit only has access to the access control data.

28 Claims, 2 Drawing Sheets

REMOTE ACCESS AND SECURITY SYSTEM

TECHNICAL FIELD

This invention relates to a remotely operable access and security system.

BACKGROUND

There are many circumstances in which it may be desirable for an owner, operator or manager of items of value to have control over access to that or those items wherever they may be and by whom.

There are many security systems available. In general such security systems may control who has access to the item of value, for example access to buildings or other sites to selected people, such as employees; access to safes, vaults and other such security containers; access to vehicles; access to information and data on a personal computer or a database. These are just a few examples.

In some circumstances existing security systems allow for remote operation of access to a fixed site. In other systems, such as electronically controlled alarms and locks on motor vehicles, the item of value is moveable, but access to it is only controllable at a local level and only by the pre-selected operator.

However, many circumstances exist where security is required in relation to an item or items which do not have a fixed location, and/or for which access is required by a range of different people, perhaps in different circumstances, and for which the owner/operator/manager will wish to retain control over who has access, where and when. To provide such flexibility, the lock may need to have different characteristics at different times or locations.

One system presently known which may be used to allow controlled access to a moveable item's location is to provide a programmable key which can communicate with the lock via a local area communications system. Such a system is described in U.S. patent specification No. U.S. Pat. No. 4,766,746. The key is programmed by an authorising person or system via a wide area communications network to enable it to open one or more locks, each of which may be identified by a unique identification number. A pin or access number may be required to verify that an authorised person has the key. The key then communicates with the lock, instructing it to open.

The key may also be programmed with information to reconfigure the characteristics of the lock, for example any time periods during which the lock will not open. This function provides increased functional flexibility to the lock and helps to avoid having to reprogram the lock at a central servicing location.

However, at present, security systems of this type require the operator to specifically program the lock. This requires someone to travel to the location of the local area communications system of the lock to enable communication with the lock to reconfigure it. This reconfiguring may be performed the next time someone wishes to enter the lock, but this person may not know how to reconfigure the lock. Alternatively, the person may forget to reconfigure the lock or may not be trusted to reconfigure the lock before accessing the items of value. Therefore, the reconfiguration may not occur, resulting in a risk of a security breach.

Another disadvantage of this method is that control intelligence relating to the lock is readable by the key and therefore may be susceptible to theft. This may compromise the security of the lock by, for example, allowing others to identify the times when the lock may be opened.

Furthermore, this type of system does not allow for simultaneous central control of access by a plurality of operators to a single value unit or site, or of access by one or more operators to multiple value units.

Other known methods of providing remote security locking include providing a direct communication link between the lock and the authorising person or system, as is described in U.S. patent specification No. 5,815,557. The direct link has the advantage of ensuring that the lock can be reconfigured at any time. One method involves the person requiring to open the lock communicating their intention to the authorising person or system and adequately identifying themselves. The authorising person or system then sends a signal to open the lock. Reconfiguration data may be sent directly to the lock via the communication link. This method has the disadvantage of requiring the authorising person or system to be available when access is required to send the command to open the lock.

Another known solution to the problem of providing remote security locking, again described in the U.S. patent specification No. 4,766,746, also involves having a direct communication link between the lock and the authorising person or system to provide configuring information and a second communication link between a key and the authorising person or system. The key receives a communication enabling it to open one or more locks and may require a PIN to ensure an authorised person is using the key. This method has the disadvantage of requiring the lock to be connected to a wide area communications network, increasing its cost and complexity and possibly limiting its portability.

Thus, it is an object of the present invention to provide a method and apparatus for enabling security for and/or access to items of value remotely that overcomes or alleviates problems in such methods and apparatus at present or at least to provide the public with a useful choice.

Other objects of the present invention may become apparent from the following description which is given by way of example only and with reference to the accompanying drawings.

SUMMARY OF THE INVENTION

According to one aspect of the present invention there is provided a remote access control system adapted to enable the remote control of access to one or more value units by one or more operators, the system including:

- a central control means including control data including an identity structure relating to the permissible behaviour of an access controller and access control data defining operator control over the access controller;
- one or more access controller, each adapted to selectively prevent or enable access to a value unit;
- one or more operator control unit, including actuating means, adapted to enable interaction of an operator with the control system;
- first communication means adapted to provide remote communication between the central control means and one or more operator control unit;
- second communication means adapted to provide remote communication between an operator control unit and one or more access controller;
- and wherein when communication of identity structure to an access controller unit is required, a virtual configuration link is created between the central control means and the access controller for that value unit, via an operator control unit, for the transfer of the identity structure from the central control means to the access controller to initialise the access controller and so allow the access control data to gain access to the access controller.

Preferably, the identity structure may include an application template and configuration data for the access controller.

Preferably, the access data may include operator control unit identification data, operator identification data and access controller identification data.

Preferably, the identity data, and optionally all the control data, may be encrypted, and at least the identity data may only be deciphered by selected access controllers and the central control means.

According to a further aspect of the invention there is provided a method of remotely controlling access to a value unit through a control system by an operator including:

providing, at a central control means, access control data relating to the control of access to a value unit by an associated access controller;

providing, at the central control means, an identity structure relating to the permissible behaviour of the access controller;

operating an operator control unit via actuating means to interact with the control system;

forming a virtual configuration link between the central control means and the access controller, via the operator control unit, for transfer of the identity structure from the central control means to the access controller via first communication means providing remote communication between the central control means and the operator control unit and second communication means providing remote communication between the operator control unit and the access controller, the identity structure initialising the access controller to allow the access control data to gain access to the access controller and therefore enable access to the value unit.

Other aspects of the present invention may become apparent from the following description which is given by way of example only and with reference to the accompanying figures.

Figure 1:
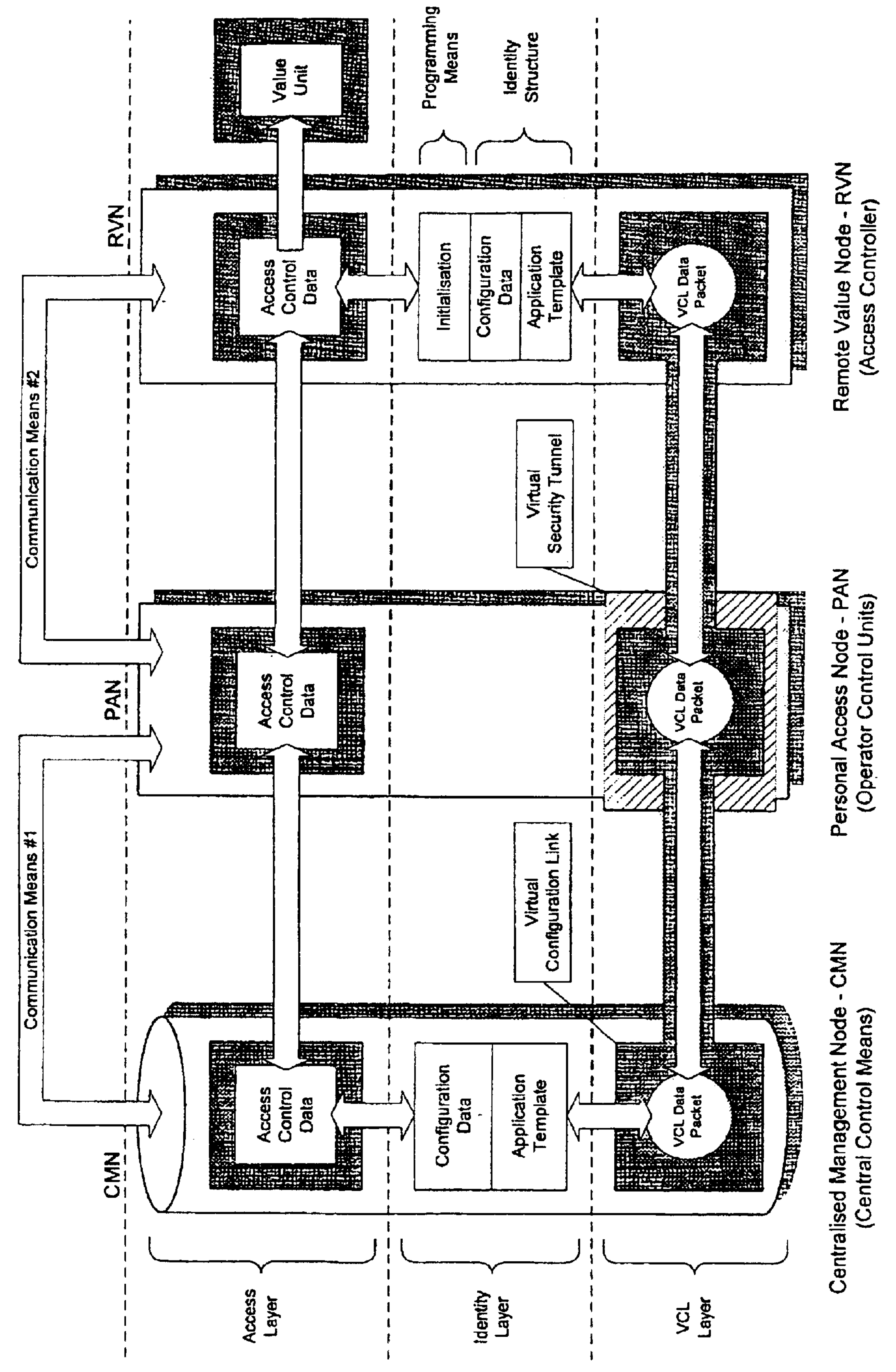
FIG. 1.

Shows a diagrammatic representation of the operation of the system of the present invention.

FIG. 2:

Shows an example of use of the system of the present invention in controlling access to shipping containers

DETAILED DESCRIPTION OF THE INVENTION

In this specification reference is made to centralised management nodes (CMNs) or central control means, personal access nodes (PANs) or operator control units and remote value nodes (RVNs) or access controllers. The term CMN is used to describe a database, management and communication system that supplies RVN identity structure, template and configuration data and access and control information to one or more PAN.

The term PAN is used to describe a personal access device which an authorised person can use to access one or more allocated RVN. Thus, a PAN will have some form of actuation means such as a portable keypad device, with communication means enabling it to communicate to the CMN and one or more RVN.

The term RVN is used to describe an electronic control device which is associated with any form of valuable item which requires controllable access. Examples of valuable items (hereafter referred to as "value units") would include shipping containers, retail security cabinets, vending machines, buildings, courier bags, and the like. These examples include locking mechanisms which may be remotely operated. It will be appreciated that there are many other types of value unit which may include locking mechanisms which could be controlled through the system of the present invention, such as personnel security access. In addition, the invention may be equally applicable to the control of access to different types of value unit, such as data and information, via security systems other than physical locks. This may include, for example, internet access, smart card cash transfer, and access to electronic databases of any type.

A PAN provides an intermediate communication link between the CMN and one or more RVN. Communication between the CMN and the or each PAN is via, for example, direct serial link using local PC connections, one or twoway pager networks, a two-way cellphone network or other means of wide area data communication.

Communication between a PAN and one or more RVN is via local area communication means, such as an infrared link, a local area RF link or a direct connection.

A RVN may include a controller unit and an associated locking mechanism. For security reasons a RVN may be located within its associated value unit. For example, if the item is a shipping container or vending machine, then the RVN would be inside that container or machine, would preferably be communicated to by the PAN by remote means, and would therefore be inaccessible except via access to the value unit by an operator of the PAN.

Any given RVN controller has a programming means suitable to store and implement an identity structure. The nature of this identity structure will depend on the nature of the value unit controlled by the RVN. It could include, as a minimum, an access combination. It may also include: time and location criteria, if the item is one which may only be accessed at specific times or dates, or at specific locations (for example controlled by a GPS unit); control criteria, such as how often the unit may be accessed, how long the unit is accessible after access is provided; user/operator group access criteria; and encryption and decryption criteria.

An RVN controller may have a plurality of identity structures so that it may be adapted to operate in a number of different ways.

The identity structure is specific to each RVN application. Each application has an identity structure including a template that can be loaded with configuration data to suit a particular application; different applications being appropriate for different value units and in different circumstances.

The system of the present invention enables the controlled access to one or more RVN from the CMN by employing a virtual configuration link (VCL) between the CMN and the one or more RVN, via one or more PAN. The VCL allows the transfer of communication data between the CMN and RVN automatically when the PAN interfaces with the RVN.

Operation of the system of the present invention is now described in broad terms with reference to FIG. 1.

Information is communicated within the system within three communication protocol layers, the access layer, identity layer and VCL layer. The system creates a secure virtual link as information communicated to the PAN from the CMN and from the PAN to the RVN remains inaccessible to the PAN access layer. The secure virtual link cannot be attacked in the PAN as the access layer does not have access to the encryption.

The access layer communicates security access and control data, which may include user interface, PAN identification, user identification, RVN identification and RVN access and control data. The access layer includes control of the remote value node to ultimately allow or prevent access to the value unit.

The identity layer controls and communicates information relating to the identity structures of the RVN. The CMN constructs the RVN identity structure which determines the behaviour of that RVN. As stated above, the RVN structure includes an application template and configuration data, and also includes initialisation instructions. Without the identity structure an RVN includes no information that would allow it to be vulnerable to "attack" or interference. If, for example, the RVN is an electronic lock on a container, the lock is a "virtual" lock until it is given an identity.

A secure VCL is created by encryption of the information in the identity structure layer. The information is only decipherable by the CMN and RVN and is transmitted as VCL data packets in the VCL by the CMN to the RVN.

The operation of the system of the present invention will now be described in broad terms.

Each PAN has a unique identification number. A PAN is "activated" by communication of its correct identification number to or from the CMN. Any given user or operator of a PAN has an access or PTN number. The CMN loads one or more user authorisations to the PAN in the form of the access or PIN number. The CMN then also loads to the PAN one or more identification numbers for one or more RVN which is to be accessed by the PAN at some time. Hence, a single PAN may be authorised to enable access to multiple RVN to a schedule. The identification numbers and access or PIN number are communicated as part of the access layer protocol. Communication between the CMN and PAN is accomplished via communication means #1 (see FIG. 1).

An application template for the or each RVN is then created by the CMN as part of the identity layer protocol. Configuration data is then loaded based on the information specifying, for example, the PAN identification number, operator identification, RVN identification and operator entry combinations. The combined information communicated by the template and configuration data will vary depending on the application of the RVN.

The combined information is encrypted such that it can only be deciphered by the RVN. This creates a secure VCL between the CMN and the remote RVN as the PAN cannot decipher the encrypted information. The encrypted information is then downloaded to the PAN as a VCL data packet Once all necessary data has been communicated from the CMN to the PAN, and a selected operator has correctly identified themselves to the PAN using their access or PIN number, the PAN communicates via communications means #2 (see FIG. 1), which may comprise a local area communications link to the or each RVN. The PAN will download the VCL data packet to a correctly identified RVN.
The controller of the RVN deciphers this data, and makes it available to the identity layer in the RVN.

At the identity layer, the RVN reconstructs the application template and loads in the configuration data, then processes this data to initialise the access layer. The configuration data in the application template defines a set of parameters which dictate the operation of the RVN. It will be appreciated that a template may remain programmed into a RVN while the configuration data may be updated through the VCL. Alternatively, a new template and configuration data may be programmed into a RVN, through the VCL each time the RVN is accessed by the PAN.

It is an important feature of the present invention that the existence of a VCL between the CMN and RVN avoids the necessity of an operator to purposefully reconfigure the RVN. When reconfiguration is required, the required data defining the identity structure is simply communicated to one or more PAN; the new identity structure being programmed automatically into the RVN the next time a PAN communicates with the RVN.

The PAN also communicates to the RVN via the access layer, data which could include operator access and control codes. Also at the access layer, the RVN validates the information and permits access to the value unit.

It will be appreciated that each PAN may have one or more assigned operators and can be programmed to access one or more RVN. Each RVN may also allow access by more than one PAN, for example to allow multiple authorised people through a door to a building.

Access and control data is "known" to the PAN and may, for example, contain user identification/PTN numbers, the PAN identification number and access combination details.

A PAN establishes the VCL between the CMN and a RVN by creating a virtual security tunnel. The CMN encrypts the identity structure and creates VCL data packets. The PAN does not have access to the encrypted configuration information contained in the VCL data packets because it does not have the required deciphering codes. When the PAN communicates with a remote RVN the VCL data packet information is downloaded to the RVN which then deciphers the information and updates the RVN template and configuration on the identity layer. The RVN can then process the user level access and control data, also communicated from the PAN.

The RVN may also store relevant information relating to its environment and conditions and communicate this information back to the CMN via a VCL established by a PAN. The information may include, for example, recordings of the air temperature around or within the RVN at various times, information relating to the time spent in any specific location or any other useful information which provides the owner/operator with a history of the circumstances of the unit. This information may be downloaded to the CMN via a PAN at the time of access.

An example of the system of the present invention in operation is now presented with specific reference to the control of access to a shipping container. It will be appreciated that shipping containers are a good example of a value unit which does not have a fixed location and which may need to be accessed at different times, in different places by a variety of different operators. It will also be appreciated that the present invention has application in numerous alternative circumstances as referred to previously.

A RVN controller may be located inside a shipping container for controlling the locking mechanism. There would be no physical connection between the RVN and the outside of the container, except for a communication means enabling communication between the controller and a PAN.

Figure 2:
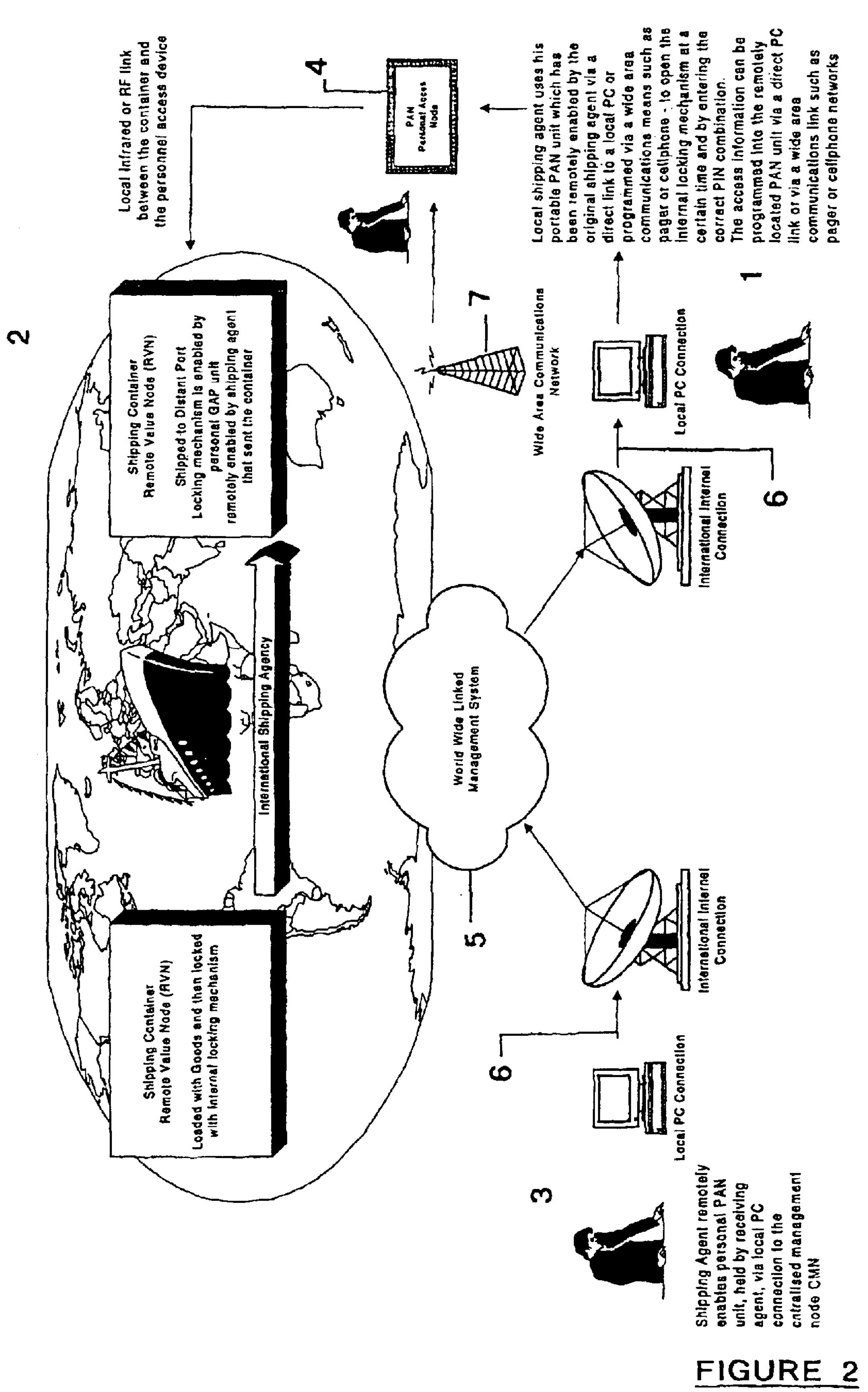

Reference is now made to FIG. 2. A remote shipping agent 1 requiring access to a container 2 at the port of destination would communicate their need to access the container to the local shipping agent or security manager 3. Alternatively, this communication may be unnecessary if the RVN in that container has been pre-programmed to enable access at specific locations and times.

The local shipping agent or security manager authorises the remote agent to access a designated container by sending authorisation data to the PAN 4 via the CMN 5. This communication is shown as being via a locally linked PC connection 6 and a wide area communications network 7.

An activated PAN transfers configuration, access and control information to the relevant RVN and thus allows access to the container 2.

Thus, using a system of the present invention an owner/manager of value units which have no fixed location can provide security access to that or those items at any given time or place and only by authorised users/operators. The VCL provides a means for the CMN to communicate with a RVN to update its identity structure, ensuring that the identity structure is updated when required and avoiding the expense of a separate communication system. The unit itself has no fixed external keypad or means of direct communication with the PAN. Furthermore, control intelligence relating to a particular RVN is held in the CMN and not in the RVN itself. The identity structure need only be loaded to the RVN immediately before access is required and removed, if necessary, after access, so that there is no useful information in the RVN which could be vulnerable to attack. Additional security is provided by encryption of data to provide a secure VCL between the CMN and RVN.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope or spirit of the invention.

What is claimed is:

1. A remote access control system adapted to enable the remote control access to one or more value units by one or more operators, the system including:

a central control means including control data including an identity structure relating to the permissible behaviour of an access controller and access control data defining operator control over the access controller;

one or more access controller, each adapted to selectively prevent or enable access to a value unit;

one or more operator control unit, including actuating means, adapted to enable interaction of an operator with the control system;

first communication means adapted to provide remote communication between the central control means and one or more operator control unit;

second communication means adapted to provide remote communication between an operator control unit and one or more access controller;

and wherein when communication of identity structure to an access controller unit is required, a virtual configuration link is created between the central control means and the access controller for that value unit, via an operator control unit, for the transfer of the identity structure from the central control means to the access controller to initialise the access controller and so allow the access control data to gain access to the access controller.

2. A remote access control system as claimed in claim 1 wherein the identity structure includes an application template and configuration data.

3. A remote access control system as claimed in claim 1 wherein the access control data includes operator control unit identification data, operator identification data and access controller identification data.

4. A remote access control system as claimed in claim 3 wherein the access control data further includes data relating to the conditions for permissible access.

5. A remote access control system as claimed in claim 1 wherein the identity structure is encrypted and can only be deciphered by selected access controllers and the central control means.

6. A remote access control system as claimed in claim 1 wherein the control data is encrypted.

7. A remote access control system according to claim 1 wherein the identity structure is inaccessible to an operator of an operator control unit.

8. A remote access control system as claimed in claim 1 wherein the first communication means includes a wide area communications network.

9. A remote access control system as claimed in claim 1 wherein the second communication means includes a wide area communications network.

10. A remote access control system as claimed in claim 8 wherein the second communication means includes a local communications link.

11. A remote access control system according to claim 1 wherein each access controller includes recordal means adapted to record data relating to the conditions or circumstances of its associated value unit.

12. A remote access control system according to claim 11 wherein the data recorded includes the conditions or circumstances of operator access.

13. A remote access control system according to claim 11 wherein the data recorded is transferred to the central control means, via the virtual configuration link.

14. A remote access control system according to claim 1 wherein each access controller includes a locking mechanism and an electronic control device.

15. A method of remotely controlling access to a value unit through a control system by an operator including:

providing, at a central control means, access control data relating to the control of access to a value unit by an associated access controller;

providing, at the central control means, an identity structure relating to the permissible behaviour of the access controller;

operating an operator control unit via actuating means to interact with the control system;

forming a virtual configuration link between the central control means and the access controller, via the operator control unit, for transfer of the identity structure from the central control means to the access controller via first communication means providing remote communication between the central control means and the operator control unit and second communication means providing remote communication between the operator control unit and the access controller, the identity structure initialising the access controller to allow the access control data to gain access to the access controller and therefore enable access to the value unit.

16. A method according to claim 15 wherein the identity data is encrypted and can only be deciphered by selected access controllers.

17. A method according to claim 15 wherein the control data is encrypted.

18. A method according to claim 15 wherein the first communication means includes a wide area cormnunications network.

19. A method according to claim 15 wherein the second comrnunication means includes a wide area communications network.

20. A method,according to claim 15 wherein the second communication means includes a local communications link.

21. A method according to claim 15 further including recording of data relating to the conditions or circumstances of the value unit by the access controller and transferring this data to the central control means via the virtual configuration link.

22. A method according to claim 21 wherein the data recorded includes the conditions or circumstances of operator access of the value unit.

23. A remote access control system as claimed in claim 1 wherein the identity structure is thereafter removed from the access controller.

24. A method according to claim 15 further including removing the identity structure from the access controller.

25. A remote access control system adapted to enable the remote control of access to one or more value units by one or more operators, the system including:

at least one access controller, to selectively prevent or enable access to a value unit;

a central controller operable to generate control data including an identity structure relating to the permissible behaviour of at least a selected one of the at least one access controller and access control data defining operator control over the access controller;

at least one operator control unit to enable interaction of an onerator with the control system, communicate with the central controller and the at least one access controller and receive and store access control data from the central controller;

a first transmitter and receiver pair for the central controller and the at least one operator control unit respectively, to provide remote communuication between the central controller and the at least one operator control unit;

a second transmitter and receiver pair provided with the at least one operator control unit and the at least one access controller respectively, to provide remote communication between the at least one operator control unit and the at least one access controller;

wherein a selected access controller prevents or enables access to a value unit based on the access control data and the identity structure, and when one of communication and update of an identity structure for the selected access controller is required, a virtual configuration link is created between the central controller and the access controller for that value unit, via an operator control unit, for the transfer of the identity structure from the central control means to the access controller, wherein the processes of communication and update of the identity structure using said second transmitter and receiver pair occurs automatically so that an operator can not communicate access control data from an operator control unit to an access controller without communicating or updating the identity structure if a said virtual configuration link has been created;

wherein the access controller is capable of being initialized, to allow the access control data to be used by the access controller to select whether to enable or prevent access to a value unit, through said virtual configuration link.

26. The remote access system of claim 25, wherein information communicated over said virtual configuration link is encrypted.

27. The remote access system of claim 25, wherein each access controller and operator control unit is operable to communicate information from an access controller to the central controller through the virtual communication link.

28. The remote access system of claim 25, wherein each operator control is capable of serving as part of a plurality of said virtual configuration links between the central controller and a plurality of said access controllers.

* * * * *